Figure 1:
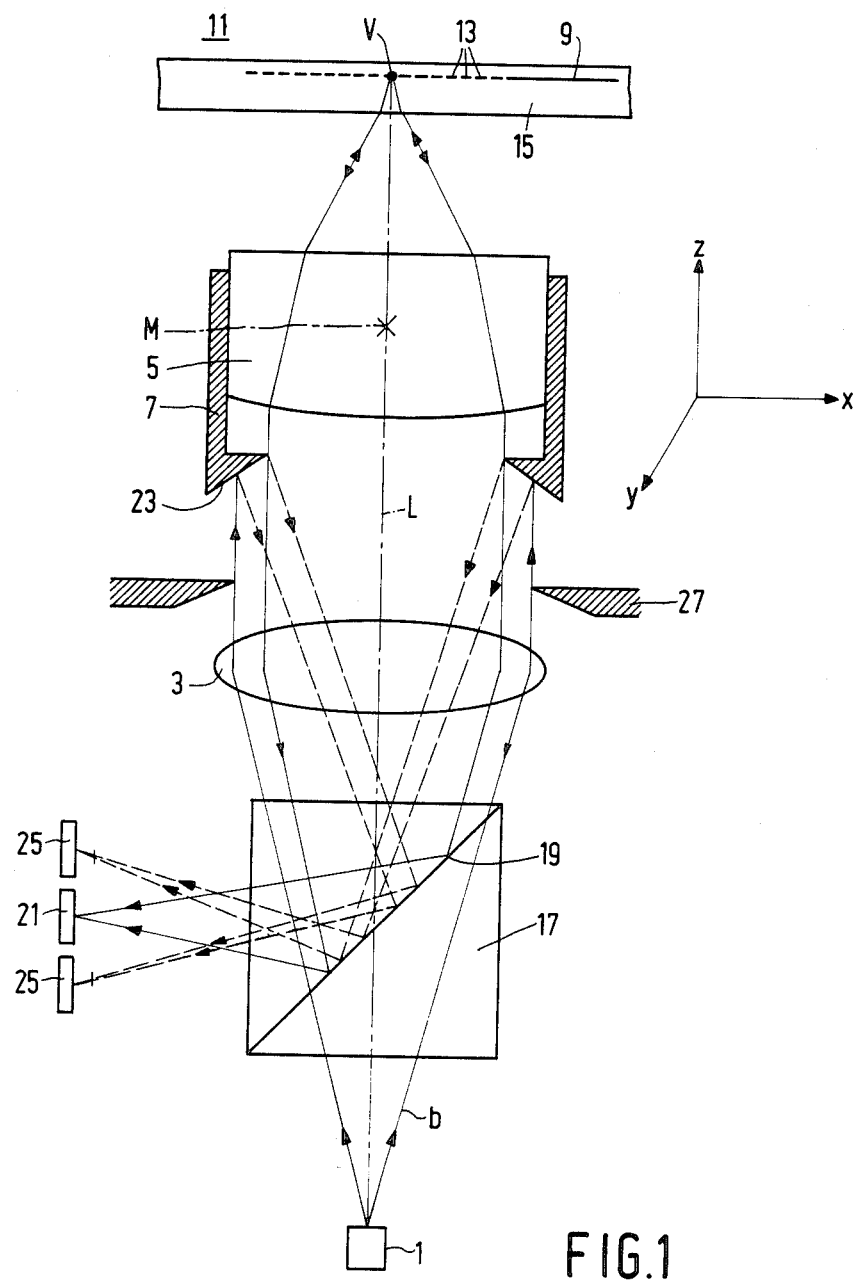

United States Patent [19]

Van Sluys

[11] Patent Number: 4,734,899
[45] Date of Patent: Mar. 29, 1988

[54] OPTICAL SCANNING UNIT FOR PROJECTING A BEAM ONTO AN OPTICAL RECORD CARRIER WITH POSITIONAL CONTROL USING SETS OF THREE COILS WITH EACH SET CONNECTED USING TWO AMPLIFIERS

[75] Inventor: Robert N. J. Van Sluys, Hasselt, Belgium

[73] Assignee: U.S. Philips Corporation, New York, N.Y.

[21] Appl. No.: 889,151

[22] Filed: Jul. 24, 1986

[30] Foreign Application Priority Data

Jan. 27, 1986 [NL] Netherlands .................. 8600168

[51] Int. Cl.⁴ .................. G11B 7/09; G11B 7/095; G11B 21/16
[52] U.S. Cl. .................. 369/45; 369/46; 350/255
[58] Field of Search .................. 369/44–46, 369/106, 112; 350/247, 252, 255, 6, 3; 318/115, 135, 495, 523, 687, 653; 310/10, 12; 356/152, 375, 400

[56] References Cited

U.S. PATENT DOCUMENTS

| | | | |
|---|---|---|---|
| 3,243,238 | 3/1966 | Lyman | 318/687 X |
| 3,373,272 | 3/1968 | Saraga | 310/10 X |
| 3,851,196 | 11/1974 | Hinds | 310/12 |
| 4,386,823 | 6/1983 | Musha | 350/255 X |
| 4,394,755 | 7/1983 | Gijzen | 369/45 |
| 4,421,997 | 12/1983 | Forys | 318/115 X |
| 4,425,043 | 1/1984 | van Rosmalen | 369/45 X |
| 4,462,096 | 7/1984 | Kusaka | 369/45 |
| 4,514,674 | 4/1985 | Hollis, Jr. et al. | 318/135 X |
| 4,602,848 | 7/1986 | Honds et al. | 350/247 |

Primary Examiner—Raymond F. Cardillo
Assistant Examiner—Wayne R. Young
Attorney, Agent, or Firm—Algy Tamoshunas

[57] ABSTRACT

The invention relates to an optical scanning unit for controlling and directing a radiation beam towards recording tracks of a surface to be scanned on an information carrier. The scanning unit comprises an objective, a translational-position and angular-position detection system for detecting the positions of the objective and an electromagnetic actuating means for correcting the position of the objective relative to the information carrier in response to the electrical error signals supplied by said position detection system. The actuating means comprises a movable objective holder with an axially magnetized magnet whose axial ends are provided with magnetic poles and at least three sets of coils situated in the magnetic field of the magnet. The coils are arranged adjacent each other viewed in the circumferential direction of the magnet and cooperate magnetically with the magnet via an air-gap. The sets of coils each comprise two peripheral coils situated substantially in the magnetic field near one of the axial ends of the magnet, and at least one central coil arranged between the two peripheral coils. The coils are each electrically connected to a matrix circuit via only two amplifiers.

5 Claims, 5 Drawing Figures

OPTICAL SCANNING UNIT FOR PROJECTING A BEAM ONTO AN OPTICAL RECORD CARRIER WITH POSITIONAL CONTROL USING SETS OF THREE COILS WITH EACH SET CONNECTED USING TWO AMPLIFIERS

The invention relates to an optical scanning unit for controlling and directing a radiation beam towards tracks on a surface of an information carrier. Such a scanning unit comprises an objective, a translational-position and angular-position detection system for detecting the positions of the objective and an electromagnetic actuating means for correcting the position of the objective relative to the information carrier in response to electrical error signals supplied by the translational-position and angular-position detection system. The actuating means comprises a movable objective holder with a cylindrical axially magnetized magnet so that the magnetic poles are at its axial ends. The actuating means further comprises at least three sets of segment coils disposed in the magnetic field of the magnet. The coils are arranged adjacent one another viewed in the circumferential direction of the magnet and cooperate with the magnet via an air gap.

Such an optical scanning unit is known from German Patent Specification No. 32 34 288, which corresponds to U.S. Pat. No. 4,602,848, herewith incorporated by reference. In this known scanning unit the objective is mounted in a movable, axially magnetised permanent-magnetic sleeve whose two axial ends form magnetic poles. The stationary segment coils are constructed as flat coils of arcuate shape comprising two coil sections which are coaxial with one another and with said sleeve. The currents through the individual coil sections are directed opposite to one another when the segment coils are energized. This arrangement produces three forces directed along the three coordinate axes of an orthogonal, triaxial system and two torques about two of said coordinate axes.

In principle, all the desired objective movements can be realized with such an actuating means of the known scanning unit. These movements comprise an axial movement which is parallel to the optical axis of the objective and which serves for focussing a light beam so as to form a light spot in an information plane of a rotating optical disc, two mutually perpendicular translational movements and/or two pivotal movements about two axes which are perpendicular to one another and to the optical axis. The translational and pivotal movements are used for radial and tangential tracking of the light spot. The pivotal movements may also be employed to provide a correction for an oblique position of the disc.

Such a translational-position and pivotal-position detection system should control the segment coils in such a way that during operation of the scanning unit the objective is brought into and is kept floating in a correct pivotal and translational position within the space formed by the sets of segment coils. Such a system is described, for example, in U.S. Pat. No. 4,425,043 and also in Netherlands Patent Application 8501665, corresponding to U.S. Pat. No. 4,638,471, both of which are herewith incorporated by reference.

The individual detection signals supplied by the translational-position and pivotal-position detection system are processed in an electronic circuit so as to generate error signals for the translational and pivotal movements of the objective.

These error signals are converted into control signals which are employed in the scanning unit for energizing the segment coils of the actuating means. For this purpose each segment coil is electrically coupled to a separate amplifier which amplifies the signal intended for the relevant segment coil to a suitable extent.

During operation of the scanning unit this arrangement ensures that the objective occupies the correct translational position and pivotal position within the scanning unit.

However, one disadvantage of the known actuating means is that the magnetic forces acting between the segment coils and the magnetic sleeve vary as a function of the axial displacement of the objective in such a way that even for a small axial displacement of the objective out of its center position between the coils, the actuating unit is no longer capable of adequately moving the objective so as to obtain both the required focussing of the light beam and the required tracking of the light spot. The segment coils, which have a substantial axial spacing from one another, can move the objective over an adequate distance along its optical axis but the possibility of generating the other movements rapidly decreases to such an extent that even at a small distance from its center position, the objective is no longer driven adequately to guarantee a correct tracking of the light spot.

It is the object of the invention to improve the optical scanning unit of the type described above in such a way that by the use of a suitable number of segment coils, an accurate positioning of the segment coils, and an effective electrical coupling of the segment coils to one another both the magnetic forces required for focussing movement and for tracking remain constant or at least substantially constant when the objective is moved over a comparatively large axial distance.

To this end the optical scanning unit or the invention is characterized in that each set of segment coils has two peripheral coils each situated substantially within the magnet field near one of the axial ends of the magnet and at least one central coil arranged between the peripheral coils. Each set of segment coils is electrically connected to a matrix circuit via only to amplifiers.

The coil configuration in accordance with the invention described above enables the central coil of each set to be energized for a displacement of the objective in two directions transverse to the optical axis and the peripheral coils of each set to be energized for a displacement of the objective along the optical axis. If desired, the peripheral coils may also be employed for tilting the objective about axes transverse to the optical axis. Thus, to focus a light beam to a spot on an information surface of an optical disc, the peripheral coils of the actuating means are be energized. For radial and tangential tracking of the light spot, the central coil is energized either above or in combination with a selective drive of the peripheral coils.

One advantage of the scanning unit in accordance with the invention, is that when the coils are energized, both the axially and radially directed magnetic forces exerted on the magnet by the coils remain at least substantially constant in the case of an axial displacement of the objective over a distance which is amply sufficient to focus and keep the light beam focussed on the information surface of an optical disc.

Another advantage of the scanning unit in accordance with the invention is that the number of amplifiers required for amplifying the error signals supplied by the linear-position and angular-position detection system to the correct extent in order to ensure an adequate drive of the segment coils without crosstalk is only two thirds of the number of segment coils used in the known system.

In a preferred embodiment of the invention one of the terminals of one of the peripheral coils in each set of segment coils and one of the terminals of the central coil are electrically connected to the output of a first amplifier. One of the terminals of the other peripheral coil and the other terminal of the central coil are electrically connected to the output of a second amplifier and the two other terminals of the peripheral coils are electrically connected to ground.

This embodiment enables all segment coils to be used for displacing the objective for radial and tangential tracking with one matrix circuit, at least three sets of at least three segment coils each and a limited number of amplifiers, the required magnetic actuating forces in the radial and the tangential direction remaining highly constant over a comparatively large axial displacement of the objective.

A suitable embodiment from the point of view of production engineering is characterized in that the segment coils of each set have the same winding direction.

If all the segment coils are made of the same winding wire and have the same dimension, the electrical impedance of the central coil will be only half the electrical impedance of the two peripheral coils of one set together. This means that when energized, the current in the central coil is twice as large as that in the peripheral coils of the same set. In certain cases this may be desirable, for example when in the center position of the objective extra large actuating forces in the radial and tangential direction are required. However, it is alternatively possible to reduce the difference in impedance between the central coil and the peripheral coils by giving the central coil a greater length. In this respect, in a further preferred embodiment the peripheral coils of each set of segment coils have equal impedances and the central coil has an impedance which is twice as large as the impedance of one of the peripheral coils. In this embodiment the segment coils of a set behave as a single coil with respect to the radially and tangentially directed actuating forces.

Figure 2:
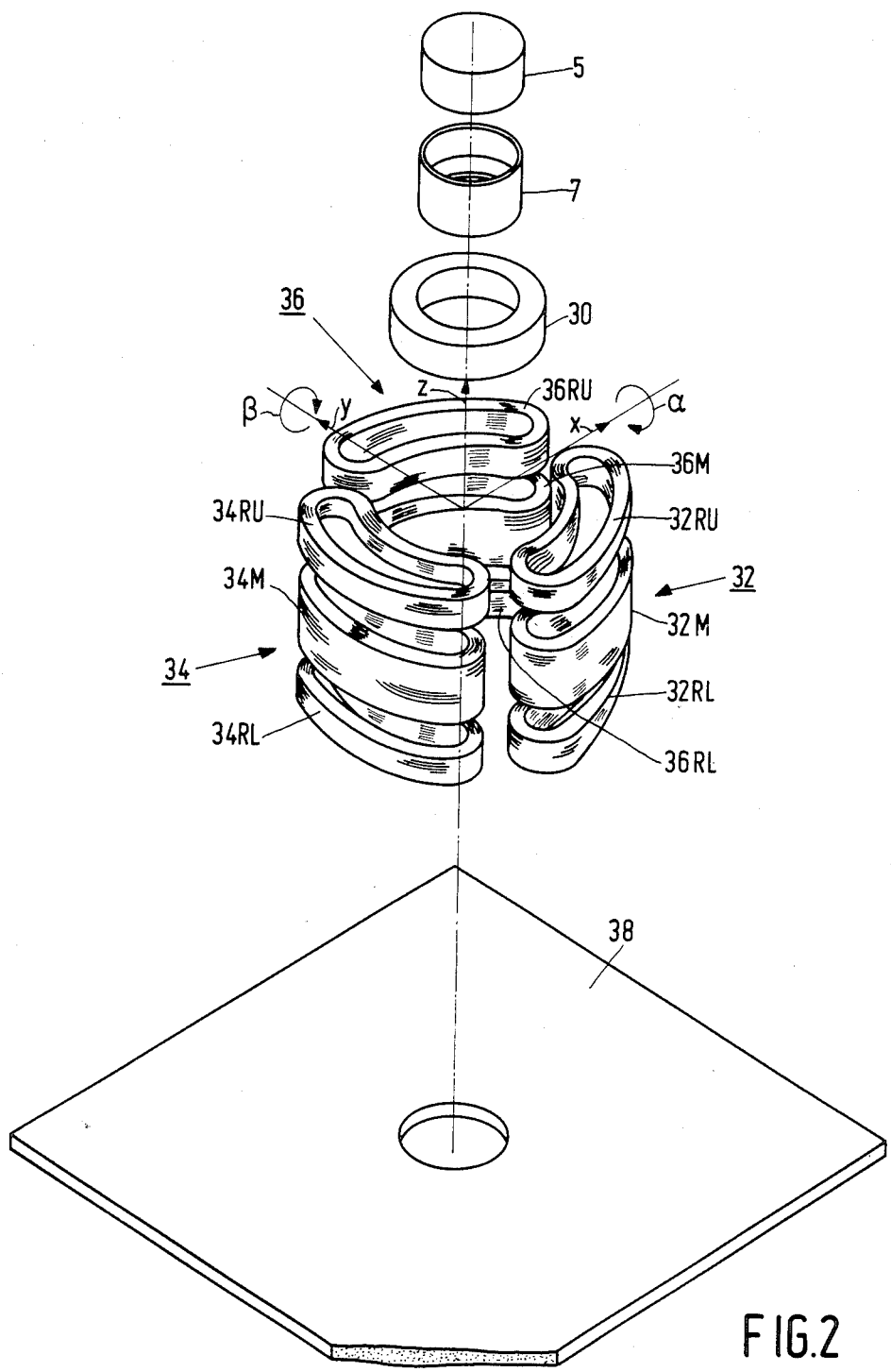
Figure 3:
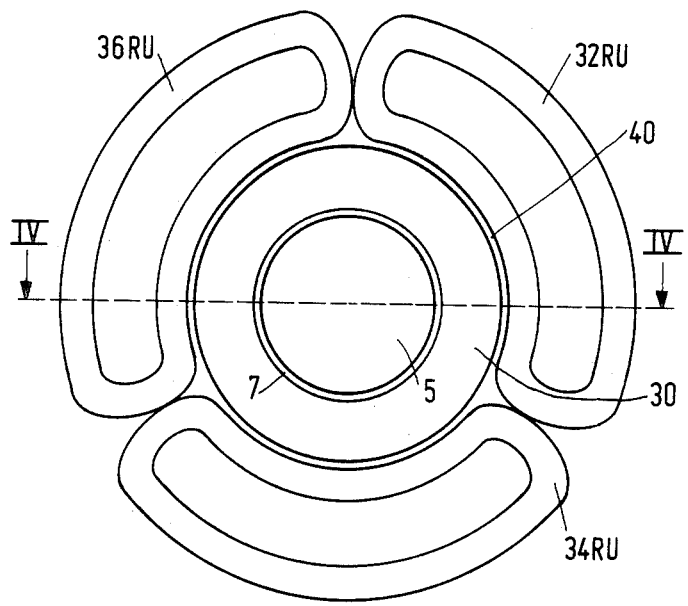
Figure 4:
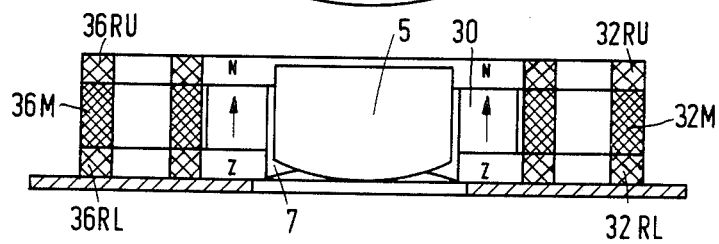
Figure 5:
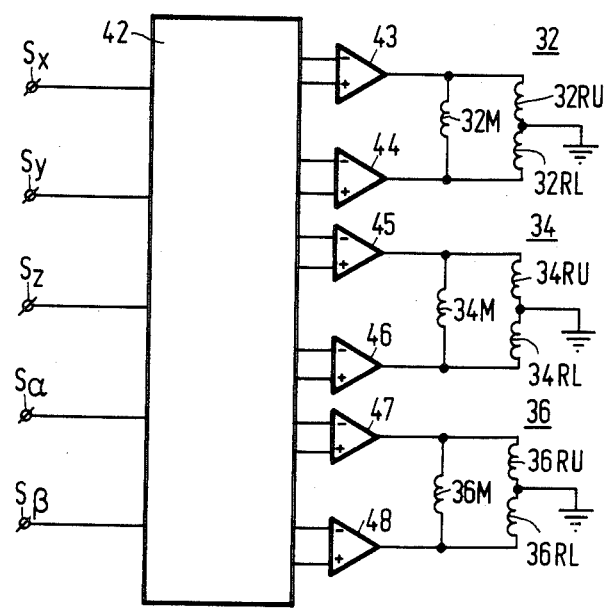

An embodiment of the invention will now be described in more detail, by way of example, with reference to the drawings, in which FIG. 1 schematically shows a part of the scanning unit in accordance with the invention, FIG. 2 is an exploded view of an example of the actuating means of the scanning unit in accordance with the invention, FIG. 3 is a plan view of the actuating means shown in FIG. 2, FIG. 4 is a sectional view taken on the line IV—IV in FIG. 2, and FIG. 5 shows the circuit arrangement of the segment coils of the actuating means shown.

The scanning unit shown in FIG. 1 comprises a radiation source 1, for example a diode laser, a collimator 3 and an objective 5, which is mounted in an objective holder. Both the objective and the collimator may comprise a plurality of lens elements.

The collimator converts the divergent read beam b produced by the radiation source into a parallel beam which adequately fills the aperture of the objective 5. The objective focusses the read beam to form a diffraction-limited radiation spot V of a diameter of, for example, 1 $\mu m$ in the plane of the information surface of a disc-shaped record carrier 11, only a small part of which is shown in radial cross-section in FIG. 1. The information is stored in concentric tracks 13 or in quasi-concentric tracks which form a spiral track. The information is encoded in a multitude of optically detectable information areas which alternate with intermediate areas. Suitably, the information surface 9 is disposed on the upper side of the record carrier, so that the read beam traverses the transparent substrate 15 of the record carrier before it reaches the information surface. Further, the information surface is preferably radiation reflecting, so that the read beam is reflected towards the radiation source.

As the record carrier is rotated relative to the scanning unit, the beam reflected by the information surface is time-modulated in conformity with the sequence of information areas and intermediate areas in an information track being scanned. In order to separate the modulated beam from the beam emitted by the radiation source, a separating element 17 is arranged in the radiation path. Element 17 may be, for example, a semi-transparent mirror or a separating prism, which may be polarisation-sensitive and whose interfaced 19 reflects at least a part of the radiation towards a radiation-sensitive information detector 21 in the form of, for example, a photo-diode. The information detector 21 converts the modulated read beam into an electric signal which is processed, in known manner, to form a signal which, depending on the type of information stored in the record carrier, is suitable for being displayed, reproduced or processed otherwise. The nature of the information and the processing of the signal from the information detector fall outside the scope of the present invention and are therefore not discussed in more detail.

The right-hand part of FIG. 1 shows an XYZ coordinate system, whose origin is in reality situated in the center M of the objective, so that the Z-axis coincides with the chief ray L. The direction of this axis may also be referred to as the axial direction. The tilt of the objective about the X-axis may be represented by the tilt angle $\alpha$ and that about the Y-axis by the tilt angle $\beta$. The X-axis and the Y-axis extend, for example, in the plane of the information surface parallel to the radial direction and the tangential direction respectively. The six theoretically possible independent degrees of freedom of movement of the objective holder and hence of the objective 5 are translations along and rotation about the three axes, the rotation about the Z-axis being irrelevant here.

In order to ensure that the objective 5 performs the movements relative to the scanning unit without any substantial physical contact between the assembly formed by the objective holder 7 and the objective 5 and the other elements of the scanning unit, the objective is suspended in electromagnetic actuating means which will be described in more detail with reference to FIGS. 2, 3 and 4. This required use of a translational-position and angular-position detection system for measuring deviations between the center M of the objective and the chief ray L of the beam b along an X-axis situated in the plane of the drawing, along a Y-axis perpendicular to the plane of the drawing, and along a Z-axis perpendicular to the said axes, and to measure tilts of the objective lens about the X-axis and the Y-axis so as to enable deviations from the translational position and tilts to be eliminated by means of a control system.

The translational-position and angular-position detection system comprises a conical-ring mirror 23 which is fixed to the objective and a radiation-sensitive detection system 25. The mirror 23 reflects that part of the radiation beam b which falls within the aperture 27 but outside the pupil of the objective towards the separating element or beam splitter 17, which in turn reflects a part of the radiation to the detection system 25. The detection system will not be described in more detail because it falls outside the scope of the present invention. A comprehensive description of such a detection system can be found in the afore-mentioned Netherlands Patent Application No. 8501665. Moreover, reference is made to U.S. Pat. No. 4,425,043 which describes a focussing-error detection system.

The error signals obtained from the translational-position and angular-position detection system relate to the displacement along the X-axis, the Y-axis and the Z-axis and the tilts about the X-axis and the Y-axis of the objective and by means of operations not described they are processed to form control signals which are designated Sx, Sy, Sz, Sα and Sβ respectively.

FIGS. 2, 3 and 4 show an electromagnetic actuating means of the scanning unit in accordance with the invention. The actuating means in principle comprises a movably suspended magnet 30 secured to the objective holder 7 and at least three sets of stationary coils 32, 34 and 36 arranged around the magnet. The magnet 30 is cylindrical and is made of a permanent-magnet material such as Neodymium-iron-boron or Samarium-cobalt. The coils of the different sets are disposed mainly in specific parts of the magnetic field of the magnet, which is axially magnetised. In order for the objective 5 to perform the required movements free from parasitic resonance, the objective is magnetically suspended within the actuating means without any physical contact between the magnet 30 and the coils.

The axially magnetised body 30 has a south pole Z and a north pole N at its axial ends, as shown in FIG. 4. The coil sets 32, 34 and 36 are arranged around the magnet 30 and are secured to a mounting plate 38. Viewed in the circumferential direction of the magnet 30, the sets 32, 34 and 36 are arranged adjacent each other and substantially surround the magnet, an air gap 40 being formed between the sets and the magnet. Each of the sets 32, 34 and 36 comprises two peripheral coils 32RU, 32RL; 34RU, 34RL and 36RU, 36RL respectively, which are disposed in areas where the magnetic field lines of the magnetic field of the magnet 30, when in its central position, extend in substantially radial directions. The center position of the magnet is to be understood to mean an at least roughly central position of the magnet relative to the peripheral coils. Each of the sets 32, 34 and 36 further comprises a central coil 32M, 34M and 36M respectively positioned between the peripheral coils in a part of said magnet field where the field lines extend in substantially axial directions.

In the present embodiment the segment coils are made of the same winding wire, the central coil having an axial dimension which is twice as large as that of the peripheral coils. The other dimensions of the coils are identical.

FIG. 5 shows schematically how the segment coils of the sets 32, 34 and 36 are electrically connected to each other and to the matrix circuit. The matrix circuit represented by the block 42 receives the control signals Sx, Sy, Sz, Sα and Sβ and translates them into suitable control signals of the correct polarity for the different sets 32, 34 and 36 of segment coils. By means of six amplifiers 43 and 44, 45 and 46, and 47 and 48 the matrix circuit is electrically coupled to the sets 32, 34 and 36, respectively, each set being arranged between two amplifiers. One terminal of each of the two peripheral coils of each set is electrically connected to the output of an amplifier and the other terminals are interconnected, the junction point being connected to ground. Both terminals of the central coils are electrically connected to the outputs of the relevant amplifiers. In the present example the segment coils 32RU, 32RL, 32M, 34RU, 34RL, 34M, 36RU, 36RL and 36M have the same winding direction viewed in the same axial direction, the peripheral coils also having the same impedance.

The matrix circuit 42 is constructed in such a way that an applied signal Sx, Sy, Sz, Sα or Sβ applied, corresponding to a specific degree of freedom of the objective 5, is transferred to the amplifiers 43, 44, 45, 46, 47 and 48 in such a way that the currents through the segment coils 32RU, 32RL, 32M, 34RU, 34RL, 34M, 36RU, 36RL and 36M mainly result in a correction movement of the objective 5 in conformity with the relevant degree of freedom without causing any significant displacement of the objective in any of the other degrees of freedom. This will be explained by means of the following Table.

|  | Sx | Sy | Sz | Sα | Sβ |
|---|---|---|---|---|---|
| 32RU | $-k_1 \cdot x$ | $+y$ | $+z$ | $+\alpha'$ | $-k_1 \cdot \beta'$ |
| 32RL | $+k_1 \cdot x$ | $-y$ | $+z$ | $+\alpha'$ | $-k_1 \cdot \beta'$ |
| 32M | $-k_1 \cdot k \cdot x$ | $-k \cdot y$ | 0 | 0 | 0 |
| 34RU | $+x$ | 0 | $+z$ | 0 | $+\beta'$ |
| 34RL | $-x$ | 0 | $+z$ | 0 | $+\beta'$ |
| 34M | $+k \cdot x$ | 0 | 0 | 0 | 0 |
| 36RU | $-k_1 \cdot x$ | $-y$ | $+z$ | $-\alpha'$ | $-k_1 \cdot \beta'$ |
| 36RL | $+k_1 \cdot x$ | $+y$ | $+z$ | $-\alpha'$ | $-k_1 \cdot \beta'$ |
| 36M | $+k_1 \cdot k \cdot x$ | $-k \cdot y$ | 0 | 0 | 0 |

The Table gives a matrix which qualitatively shows which coils should be energised with a current of a specific phase in order to obtain a specific displacement X, Y or Z or tilt α or β of the objective. The symbols x, y, z, α' and β' in the Table must be thought to be preceded by a proportionally factor for the signals Sx, Sy, Sz, Sα and Sβ respectively. Moreover, there may be further proportionality factors such as the factors k and $k_1$ given in the Table. The factor k allows for the ratio between the impedance of the central coils and the impedance of the peripheral coils. Suitably, k=1 if the impedance of the central coil of a set of segment coils is twice as large as the impedance of one of the peripheral coils. If the central coil has an impedance smaller or larger than twice the impedance of a peripheral coil, this will result in k>1 and k<1 respectively. It has been demonstrated theoretically and experimentally that the factor $k_1$ should preferably be ½ because for this value the crosstalk is minimal in the sense that no displacements in the Z-direction are produced when the objective is corrected in the X and β directions.

As will be evident from the matrix the center coils 32M, 34M and 36M should be energized only for translational movements in the X and Y direction of the objective. The energization of the coils as given in the table can be obtained in a suitable manner by arranging and connecting the coils as shown in FIG. 5.

The above Table shows that the matrix circuit transfers the following control signals to the inputs of the amplifiers 43 to 48:

amplifier 43: $-k_1.x'.Sx + y'.Sy + z'.Xz + \alpha''.S\alpha - k_1.\beta''.S\beta$ amplifier 44: $k_1.x'.Sx - y'.Sy + z'.Sz + \alpha''.S\alpha - k_1.\beta''.S\beta$ amplifier 45: $x'.Sx + z'.Sz + \beta''.S\beta$ amplifier 46: $-x'.Sx + z'.Sz + \beta''.S\beta$ amplifier 47: $-k_1.x'.Sx - y'.Sy + z'.Sz - \alpha''.S\alpha - k_1.\beta''.S\beta$ amplifier 48: $k_1.x'.Sx + y'.Sy + z'.Sz - \alpha''.S\alpha - k_1.\beta''.S\beta$ The symbols $x'$, $y'$, $z'$, $\alpha''$ and $\beta''$ should be read as further portionality factors for the control signals $Sx$, $Sy$, $Sz$, $S\alpha$ and $S\beta$.

What is claimed is:

1. An optical scanning unit for controlling and directing a radiation beam towards recording tracks on a surface to be scanned of an information carrier, which scanning unit comprises an objective, a translational-position and angular-position detection system for detecting the position of the objective and an electro-magnetic actuating means for correcting the position of the objective relative to the information carrier in response to electrical error signals supplied by the translational-position and angular-position detection system, the actuating means comprising a movable objective holder which comprises a cylindrical axially magnetized magnet with magnetic poles at its axial ends and at least three sets of coils disposed in the magnetic field of the magnet, which sets are arranged adjacent one another viewed in the circumferential direction of the magnet and cooperate with the magnet via an airgap, characterized in that each set of coils comprises two peripheral coils which are each situated substantially within the magnetic field near opposite axial ends of said magnet, and at least one central coil arranged between the peripheral coils, and each set of coils is electrically connected to a matrix circuit via only two amplifiers, which matrix circuit receives said error signals and supplies control signals to said amplifiers.

2. An optical scanning unit as claimed in claim 1, characterized in that for each set of coils one of the terminals of one of the peripheral coils and one of the terminals of the central coil are electrically connected to the output of one of said two amplifiers, one of the terminals of the other peripheral coil and the other terminal of the central coil are electrically connected to the output of the other of said two amplifiers, and the two other terminals of the peripheral coils are electrically connected to ground.

3. An optical scanning unit as claimed in claim 2, characterized in that the coils of each set have the same winding direction.

4. An optical scanning unit as claimed in claim 2 or 3, characterized in that the peripheral coils of each set of coils have equal electrical impedances and the central coil has an impedance which is twice as large as the impedance of one of the peripheral coils.

5. An optical scanning unit as claimed in claim 1, characterized in that the matrix circuit transfers a control signal applied to said matrix circuit and corresponding to a specific degree of freedom of the objective to the amplifiers in such a way that the currents through the coils mainly result in a corrective movement of the objective in accordance with the relevant degree of freedom without any significant displacement of the objective in accordance with any other degree of freedom.

* * * * *

UNITED STATES PATENT AND TRADEMARK OFFICE
CERTIFICATE OF CORRECTION

PATENT NO. : 4,734,899

DATED : March 29, 1988

INVENTOR(S) : Robert N.J. Van Sluys

It is certified that error appears in the above-identified patent and that said Letters Patent is hereby corrected as shown below:

IN THE TITLE

Change "OPTICAL SCANNING UNIT FOR PROJECTING A BEAM ONTO AN OPTICAL RECORD CARRIER WITH POSITIONAL CONTROL USING SETS OF THREE COILS WITH EACH SET CONNECTED USING TWO AMPLIFIERS"

To -- OPTICAL SCANNING UNIT FOR PROJECTING A BEAM ONTO AN OPTICAL RECORD CARRIER --

Signed and Sealed this

Eleventh Day of April, 1989

Attest:

DONALD J. QUIGG

*Attesting Officer*     *Commissioner of Patents and Trademarks*